United States Patent [19]

Ishibashi et al.

[11] Patent Number: 4,891,520

[45] Date of Patent: Jan. 2, 1990

[54] RADIATION DETECTOR

[75] Inventors: Hiroyuki Ishibashi; Kazushi Shimizu; Kenzo Susa, all of Tsukuba; Shinzou Kubota, Tokyo, all of Japan

[73] Assignee: Hitachi, Ltd., Tokyo, Japan

[21] Appl. No.: 239,988

[22] Filed: Sep. 2, 1988

[30] Foreign Application Priority Data

Sep. 5, 1987 [JP] Japan ................................ 62-222840
Sep. 5, 1987 [JP] Japan ................................ 62-222841

[51] Int. Cl.$^4$ ............................................. G01T 1/202
[52] U.S. Cl. .................................. 250/367; 250/483.1; 250/486.1; 252/301.4 F
[58] Field of Search ................. 252/301.4 F; 250/367, 250/483.1, 486.1

[56] References Cited

U.S. PATENT DOCUMENTS 4,647,781  3/1987  Takagi et al. .................... 250/483.1

OTHER PUBLICATIONS

Dahlbom et al., "IEEE Trans. Nucl. Sci.", vol. NS-32, No. 1, Feb. 1985, pp. 533-537.
Kesselberg et al., "IEEE Trans. Nucl. Sci.", vol. NS-32, No. 1, Feb. 1985, pp. 907-911.
Eriksson et al., "IEEE Trans. Nucl. Sci.", vol. 33, No. 1, Feb. 1986, pp. 446-451.

Primary Examiner—Jack Cooper
Attorney, Agent, or Firm—Antonelli, Terry & Wands

[57] ABSTRACT

A radiation detector containing as a scintillator a combination of two or more single crystals of cerium doped gadolinium silicate having different Ce concentrations, or a single crystal of cerium doped gadolinium silicate having different Ce concentrations therein, is improved in a spatial resolution and a time resolution.

9 Claims, 3 Drawing Sheets

RADIATION DETECTOR

BACKGROUND OF THE INVENTION

This invention relates to a radiation detector suitable for use, for example, in a positron CT (i.e. a positron computerized axial tomography) for measuring the distribution of a positron emitting nuclide administered to a human body.

The positron CT is a device for exhibiting the measuring results in images obtained by administering a positron emitting isotope (RI) such as $^{11}C$, $^{13}N$, $^{15}O$, $^{18}F$, or the like to a patient, detecting $\gamma$-rays (511 KeV) emitted at opposite directions by two radiation detectors positioned around the patient simultaneously, and measuring the distribution of RI in the patient.

Heretofore, in order to improve a spatial resolution of the positron CT, it is proposed to use a multi-channel type radiation detector wherein each one single crystal scintillator of GSO (cerium doped gadolinium silicate $Gd_2SiO_5$:Ce) and one single crystal scintillator of BGO (bismuth germanate $Bi_4Ge_3O_{12}$) are combined with each one photomultiplier tube [L. Eriksson et al: IEEE Trans. Nucl. Sci., vol 33, No. 1, pp 446–451 (1986)]. Since a luminescence decay time of BGO is 300 ns and that of GSO is 60 ns, it is possible to judge which scintillator, BGO or GSO, passes a radiation due to the difference in the luminescence decay time in such a multi-channel type radiation detector. But in such a case, the time resolution is poor, since it is determined by the BGO scintillator which has a longer luminescence decay time. Therefore, there is a problem in that the effect of using the GSO scintillator which has a very short luminescence decay time is a little.

In order to improve the time resolution of positron CT, it is necessary to employ a combination of two kinds of scintillators having a very short luminescence decay time and at the same time having different luminescence decay times. But no combination of scintillators having such properties has been found.

On the other hand, as a scintillator having a short luminescence decay time which can be changed with the concentration of an element doping material, it is known $CaF_2$ doped with Ce [B. Jone, et al: Nucl. Instr. and Meth., vol. 143, p 487 (1977)]. But this scintillator cannot be used practically, since a light output is also changed with the amount of Ce doped. Further, since this scintillator is small in the absorption coefficient for X-rays or $\gamma$-rays due to a small effective atomic number and a small density, the time resolution becomes worse when applied to a positron CT.

SUMMARY OF THE INVENTION

It is an object of the present invention to provide a radiation detector improved in both the spatial resolution and the time resolution at the same time when applied to a positron CT.

This invention provides a radiation detector comprising a scintillator and a photodetector for detecting light from said scintillator, said scintillator comprising a combination of two or more single crystals of cerium doped gadolinium silicate represented by the formula:

$$Gd_{2(1-x)}Ce_{2x}SiO_5 \qquad (I)$$

wherein x is in the range of $5 \times 10^{-4} \leq x \leq 1 \times 10^{-2}$, and having different x values in the formula (I).

The present invention also provides a radiation detector comprising a scintillator and a photodetector for detecting light from said scintillator, said scintillator comprising a single crystal of cerium doped gadolinium silicate represented by the formula:

$$Gd_{2(1-x)}Ce_{2x}SiO_5 \qquad (I)$$

wherein x is in the range of $5 \times 10^{-4} \leq x \leq 1 \times 10^{-2}$, and the value of x being changed in the single crystal.

DESCRIPTION OF THE PREFERRED EMBODIMENTS

Figure 1:
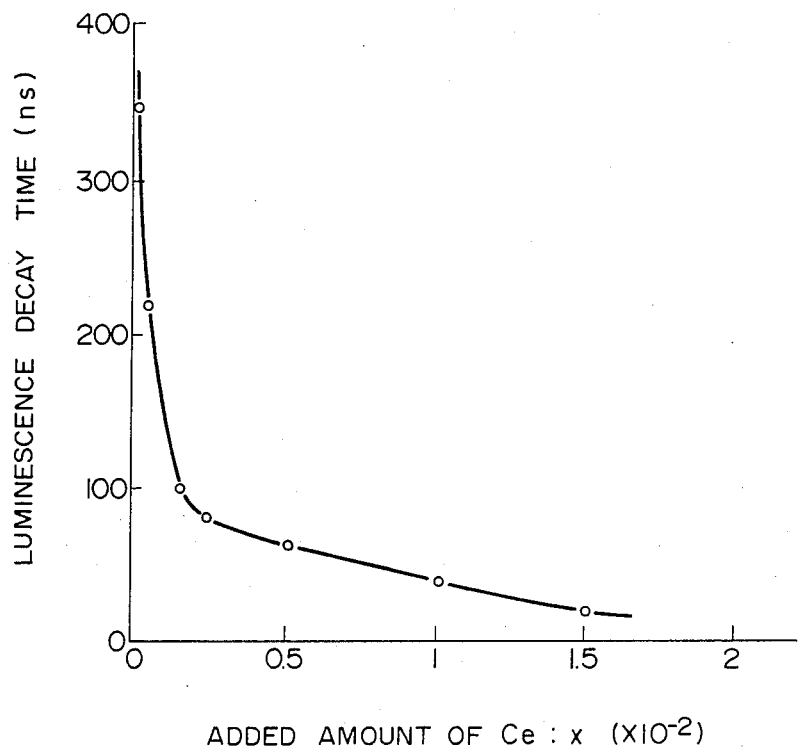
FIG. 1 is a graph showing a relationship between the added amount of Ce (x) and the luminescence decay time.

The radiation detector of the present invention is characterized by the use of special scintillator, which is explained by referring to FIG. 1.

FIG. 1 is a graph showing a relationship between the added amount of Ce (x) and the luminescence decay time of a scintillator produced from a single crystal of cerium doped gadolinium silicate (GSO) represented by the formula:

$$Gd_{2(1-x)}Ce_{2x}SiO_5 \qquad (I)$$

wherein x is changed from $3 \times 10^{-4}$ to $2 \times 10^{-2}$.

As shown in FIG. 1, when x is $3 \times 10^{-4}$, the luminescence decay time becomes 350 ns, which time is undesirably longer than the BGO scintillator. On the other hand, when x is $1.5 \times 10^{-2}$ or more, the crystal is colored to lower the light output. Therefore, a preferable value of x is in the range of from $5 \times 10^{-4}$ to $1 \times 10^{-2}$ ($5 \times 10^{-4} \leq x \leq 1 \times 10^{-2}$).

Values shown in FIG. 1 can be tabulated as follows

TABLE 1

| x in the formula (I) | Luminescence decay time |
| --- | --- |
| $3 \times 10^{-4}$ | 350 ns |
| $5 \times 10^{-4}$ | 220 |
| $1.5 \times 10^{-3}$ | 100 |
| $2.5 \times 10^{-3}$ | 80 |
| $5 \times 10^{-3}$ | 60 |
| $1 \times 10^{-2}$ | 40 |
| $1.5 \times 10^{-2}$ | 30 |

The single crystal of cerium doped gadolinium silicate (GSO) of the formula (I) can be obtained by growing from a melt by the Czochralski method.

Figure 3:
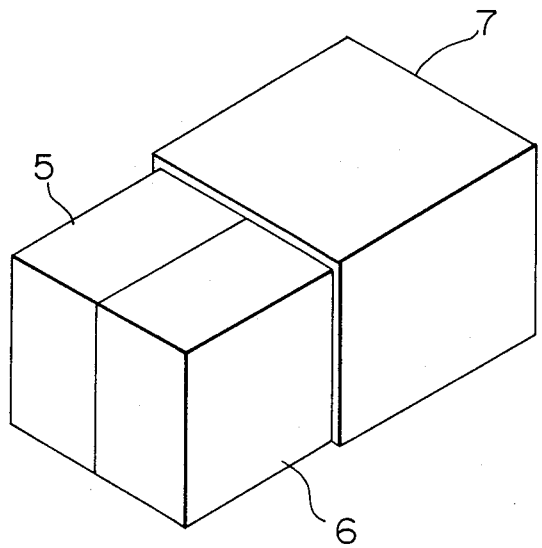
FIG. 3 is a perspective view of a radiation detector comprising a scintillator and a photodetector.

For example, a scintillator produced from a single crystal of GSO of the formula (I) wherein x is $1.5 \times 10^{-3}$ has a luminescence decay time of 100 ns, whereas that produced from a single crystal of GSO of the formula (I) wherein x is $5 \times 10^{-3}$ has a luminescence decay time of 60 ns. When a scintillator comprising a combination of these single crystals is combined with a photomultiplier tube as shown in FIG. 3 and used in a positron CT, the time resolution is improved remarkably compared with a known multi-channel type radiation detector wherein the GSO-BGO combination is used. FIG. 3 is a perspective view of a radiation detector wherein numeral 5 is a GSO single crystal having $x = 1.5 \times 10^{-3}$ and numeral 6 is a GSO single crystal having $x = 5 \times 10^{-3}$, and numeral 7 is a photomultiplier tube.

In the present invention, two or more single crystals of GSO of the formula (I) wherein x is a value in the range of from $5 \times 10^{-4}$ to $1 \times 10^{-2}$ and having different x values are used in combination to form a scintillator. The combination of two or more GSO single crystals of the formula (I) having different x values requires a difference in the luminescence decay time to some extent so as to secure the spatial resolution. Such a difference is depending on the performance of the photodetector and about 20% difference in the x values is sufficient taking the performance of today's photodetector into consideration. Therefore, it is important to select proper x values for the two or more GSO single crystals of the formula (I) so as to make the difference in the x values by 20% or more.

By using the radiation detector of the present invention in a positron CT, it is possible to improve not only the spatial resolution and time resolution simultaneously but also the spatial resolution due to the same properties such as a radiation absorption coefficient, etc. since the scintillator matrix is made of the same materials only different in x values.

It is also possible to use one or more other single crystals other than those mentioned above in addition to the combination of two or more GSO single crystals of the formula (I) having different x values as a scintillator. Since the changing range of luminescence decay time due to the amount of Ce in GSO single crystal is limited when the combination of two or more GSO single crystals of the formula (I) having different x values is used as a scintillator, there is a tendency to make it difficult to give a multi-channel type having 3 or more channels. Particularly when the GSO single crystals are combined with one or more scintillators having the luminescence decay time of 60 ns or less or longer than 220 ns, it is possible to provide a multi-channel type radiation detector having 3 channels or more.

Examples of single crystals giving the luminescence decay time of shorter than 60 ns used as a scintillator are CsF, BaF$_2$, plastic scintillator, etc. Examples of single crystals giving the luminescence decay time of longer than 220 ns used as a scintillator are CsI:Tl, Bi$_4$Ge$_3$O$_{12}$, CdWO$_4$, NaI:Tl, CaF$_2$:Ev, KI:Tl, CaWO$_4$, ZnWO$_4$, etc.

As mentioned above, a scintillator produced by using GSO single crystal of the formula (I) wherein x is $1.5 \times 10^{-3}$ has a luminescence decay time of 100 ns and that produced by using GSO single crystal of the formula (I) wherein x is $5 \times 10^{-3}$ has a luminescence decay time of 60 ns. On the other hand a scintillator produced by using Bi$_4$Ge$_3$O$_{12}$ single crystal obtained by the Czochralski method has a luminescence decay time of 300 ns. When these three scintillators are connected to one photomultiplier tube, it is possible to judge which scintillator passes the radiation.

By using one or more single crystals showing the luminescence decay time of 60 ns or less or longer than 220 ns in addition to the combination of two or more GSO single crystals of the formula (I) having different x values as a scintillator, it is possible to select the luminescence decay time from a wide range to more improve properties of the radiation detector of the present invention.

In the present invention, it is also possible to use as a scintillator a GSO single crystal of the formula (I) wherein the value of x changes in the single crystal, preferably by 20% or more. By the use of such a single crystal, the spatial resolution can further be improved compared with the case of using a plurality of GSO single crystals having different Ce added amounts and subjected to separate processing to provide scintillators, and the complicated processing of the crystals can be improved.

By changing the adding amount of Ce to a GSO single crystal of the formula (I), the luminescence decay time can optionally be distributed in the single crystal, and thus to easily improve the spatial resolution.

Figure 2A:
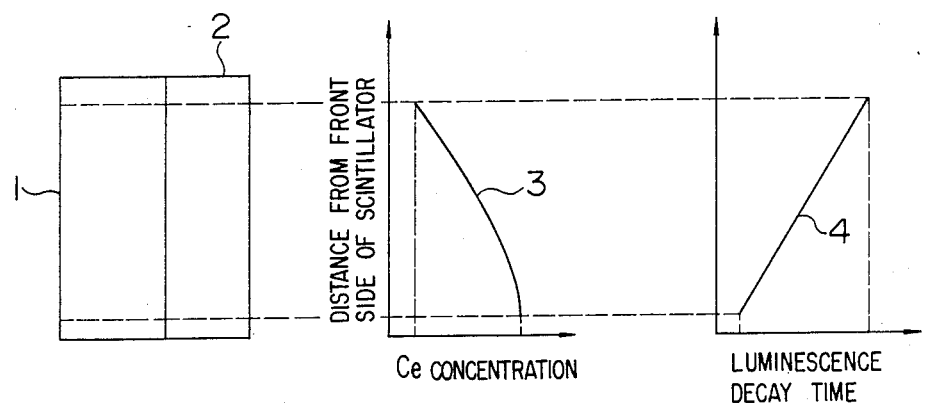
FIGS. 2(a) and (b) are graphs showing relationships between the Ce concentration, the luminescence decay time and the distances from the front sides of scintillators 1 and 1', respectively.
Figure 2B:
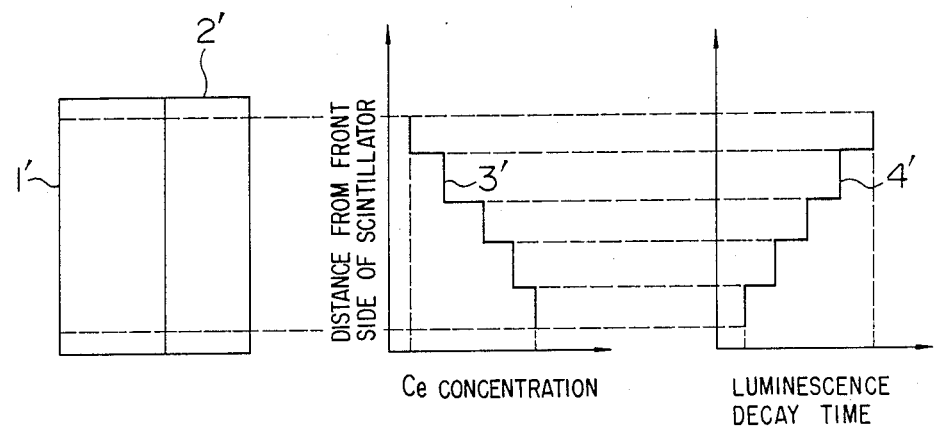

This can be explained referring to FIGS. 2(a) and (b), which are graphs showing relationships between the usable Ce concentration, the luminescence decay time and the distance from the front side of scintillator 1 or 1'. FIG. 2(a) shows a case wherein the Ce added amount (concentration) is changed in step-less form. FIG. 2(b) shows a case wherein the Ce added amount (concentration) is changed stepwise. For example, when a single crystal of Gd$_{2(1-x)}$Ce$_{2x}$SiO$_5$ wherein x is changed continuously from $1.5 \times 10^{-2}$ to $5 \times 10^{-3}$ is grown by the Czochralski method, a scintillator produced by using this single crystal shows the luminescence decay time of 100 ns at the top portion and 60 ns at the bottom portion and changed continuously between the two values as shown in FIG. 2(a). In FIGS. 2(a) and (b), numerals 1 and 1' are scintillators, numerals 2 and 2' are photodetectors, numerals 3 and 3' are Ce concentration distribution curves, and numerals 4 and 4' are luminescence decay time distribution curves.

When such a Ce concentration distribution type GSO single crystal scintillator is used in a multi-channel type radiation detector, which is further used in a positron CT, the spatial resolution is remarkably improved. Particularly when such a radiation detector is applied to a multi-ring type positron CT which requires higher spatial resolution, the effect is very large.

Depending on purposes, the Ce concentration distribution type GSO single crystal scintillator can be used in combination with distribution type or conventional scintillators as a second and a third scintillators.

What is claimed is:

1. A radiation detector comprising a scintillator and a photodetector for detecting the light from said scintillator, said scintillator comprising a combination of two or more single crystals of cerium doped gadolinium silicate represented by the formula:

$$Gd_{2(1-x)}Ce_{2x}SiO_5 \qquad (I)$$

wherein x is in the range of $5 \times 10^{-4} \leq x \leq 1 \times 10^{-2}$, and said single crystals having x values in the formula (I) that differ from each other by 20% or more.

2. A radiation detector according to claim 1, wherein one single crystal has an x value of $5 \times 10^{-3}$ and another single crystal has an x value of $1.5 \times 10^{-3}$.

3. A radiation detector according to claim 1, wherein the scintillator further comprises one or more single crystals having a luminescence decay time of 60 ns or less, or longer than 220 ns.

4. A radiation detector according to claim 3, wherein the single crystal showing a luminescence decay time of 60 ns or less is CsF or BaF$_2$.

5. A radiation detector according to claim 3, wherein the single crystal showing a luminescence decay time of longer than 220 ns is CsI:Tl, Bi$_4$Ge$_3$O$_{12}$, CdWO$_4$, NaI:Tl, KI:Tl, CaWO$_4$ or ZnWO$_4$.

6. A radiation detector comprising a scintillator and a photodetector for detecting light from said scintillator, said scintillator comprising a single crystal of cerium doped gadolinium silicate represented by the formula:

$$Gd_{2(1-x)}Ce_{2x}SiO_5 \quad (I)$$

wherein x is in the range of $5 \times 10^{-4} \leq x \leq 1 \times 10^{-2}$, and said crystal having portions with x values that differ from each other by 20% or more.

7. A radiation detector according to claim 6, wherein the scintillator further comprises one or more single crystals having a luminescence decay time of 60 ns or less, or longer than 220 ns.

8. A radiation detector according to claim 7, wherein the single crystal showing a luminescence decay time of 60 ns or less is CsF or BaF$_2$.

9. A radiation detector according to claim 7, wherein the single crystal showing a luminescence decay time of longer than 220 ns is CsI:Tl, Bi$_4$Ge$_3$O$_{12}$, CdWO$_4$, NaI:Tl, KI:Tl, CaWO$_4$ or ZnWO$_4$.

* * * * *

UNITED STATES PATENT AND TRADEMARK OFFICE
CERTIFICATE OF CORRECTION

PATENT NO. : 4,891,520

DATED : January 2, 1990

INVENTOR(S) : H. Ishibashi et al.

It is certified that error appears in the above-identified patent and that said Letters Patent is hereby corrected as shown below:

On the Title Page:

The Assignee is incorrect; should read as follows:

--Hitachi Chemical Co., Ltd., Tokyo, Japan--

Signed and Sealed this

Twenty-third Day of July, 1991

*Attest:*

HARRY F. MANBECK, JR.

*Attesting Officer*     *Commissioner of Patents and Trademarks*